United States Patent [19]
Conrad

[11] 3,815,201
[45] June 11, 1974

[54] METHOD FOR MANUFACTURING A GEAR WHEEL

[75] Inventor: Winthrop B. Conrad, Franklin, Mich.

[73] Assignee: Teleflex Incorporated, North Wales, Pa.

[22] Filed: June 18, 1973

[21] Appl. No.: 370,751

Related U.S. Application Data

[62] Division of Ser. No. 228,028, Feb. 22, 1972, Pat. No. 3,772,936.

[52] U.S. Cl............... 29/159.2, 29/159 R, 29/527.1
[51] Int. Cl.... B21d 53/28, B23p 15/14, B21h 5/00, B21k 1/30
[58] Field of Search............ 29/159.2, 527.1, 159 R; 74/432, 434, 243 R, 230.4, 230.5; 72/376, 377

[56] References Cited
UNITED STATES PATENTS

| | | | |
|---|---|---|---|
| 2,845,809 | 8/1958 | Hetzel | 74/440 |
| 3,272,027 | 9/1966 | Wayman | 74/434 X |
| 3,429,700 | 2/1969 | Wiegand et al. | 29/159.2 X |
| 3,535,948 | 10/1970 | Winzeler et al. | 29/159.2 X |
| 3,599,503 | 8/1971 | Schultz, Jr. | 29/159 R X |
| 3,732,606 | 5/1973 | Germond | 29/148.4 A |

Primary Examiner—Charles W. Lanham
Assistant Examiner—Victor A. DiPalma
Attorney, Agent, or Firm—McGlynn & Milton

[57] ABSTRACT

This disclosure relates to a gear wheel and method for making the same which is used in an assembly including a flexible motion transmitting core element utilized to transmit motion in a curved path. The gear wheel includes a circular metal wheel comprised of two substantially identical metal halves mated together to define a peripheral groove with helical teeth disposed therein for engaging helical windings on the core element and a plastic hub portion molded partially about the circular metal wheel including an axial bore therethrough for receiving a support member or drive shaft.

6 Claims, 5 Drawing Figures

PATENTED JUN 11 1974  3,815,201

METHOD FOR MANUFACTURING A GEAR WHEEL

This application is a divisional of U.S. application Ser. No. 228,028 filed Feb. 22, 1972, now U.S. Pat. No. 3,772,936.

This invention relates to an improved gear wheel and a method for making the same. The gear wheel of the instant invention is used in an assembly including a flexible motion transmitting core element utilized to transmit motion in a curved path. In such assemblies the gear wheel engages the motion transmitting core element to move it or be moved by it to transmit motion via the core element. The core element takes the form of a cable having a plurality of strands wound together with a wire wrapped spirally thereabout on a short lead to define gear engaging teeth of the spirally wrapped wire.

Various types of flexible cable-operated control mechanisms make use of a metal gear wheel having helical gear teeth which engage such a spirally wound multiple wire cable whereby rotary motion of the gear wheel is translated to linear motion of the cable or vice versa. Hence, a hand crank, electric motor or the like may be used to turn the gear wheel, the rotation of the gear wheel causing linear motion of a flexible cable, the end, or ends, of which may be connected to a member to be moved, or controlled, either directly or through a similar rotary member to which the linear motion of the cable imparts rotary motion. Slippage between the rotary member and the cable is prevented by the mating engagement of the helical teeth on the gear wheel and the wire wrapped spirally about the multi-stranded cable. The gear wheel must have a circumferential, radially inwardly extending groove in the outer periphery thereof for nesting and retention of the flexible cable therein and with the helical gear teeth being formed within this groove, the gear teeth being disposed between adjacent convolutions.

In some applications the flexible cable engages the gear wheel tangentially in contrast to being partially wrapped around the circumference of the gear wheel; therefore, in the former case only a few of the helical gear teeth engage the windings on the flexible cable. Due to the small number of helical teeth mating with the flexible cable, it is desirable, if not required, that the helical teeth be made of a high strength material such as metal to withstand the concentrated stresses which occur in service.

A popular method for manufacturing a metal gear wheel of this type is to machine a gear blank and thereafter, by hobbing and tapping operations, produce the desired gear wheel configuration. Due to the high cost of these machining operations, less expensive, alternative methods are desirable. Another method for manufacturing a gear wheel includes molding a gear wheel from a plastic material, thereby employing the favorable characteristics of plastic, for example low friction, light weight, low cost and workability. However, plastic gear wheels do not have high strength and have application only in areas where high strength is not a design requirement, thereby precluding their use in heavy duty application. Plastic gear wheels may be used when, in the case previously mentioned, the flexible cable is partially wrapped around the gear wheel.

It is therefore an object and advantage of the instant invention to provide a gear wheel assembly for moving a motion transmitting element which includes a circular, metal means defining a plurality of gear teeth disposed about the periphery thereof, and plastic hub means for supporting the metal means on a drive means which facilitates rotation of the wheel whereby the gear teeth may engage a motion transmitting core element or flexible cable.

It is also an object and advantage of the instant invention to provide a method for manufacturing a gear wheel assembly which includes stamping at least two metal sections of substantially identical shape, forming helical gear teeth in a concave depression on the periphery thereof, mating the sections to cause the gear teeth in each of the sections to be aligned with the teeth in the other section and molding a plastic hub portion partially about the section to support the sections on a drive means.

Other objects and advantages of the instant invention will be readily appreciated as the same becomes better understood by references to the following detailed description when considered in connection with the accompanying drawings made in accordance with the instant invention wherein.

Figure 1:
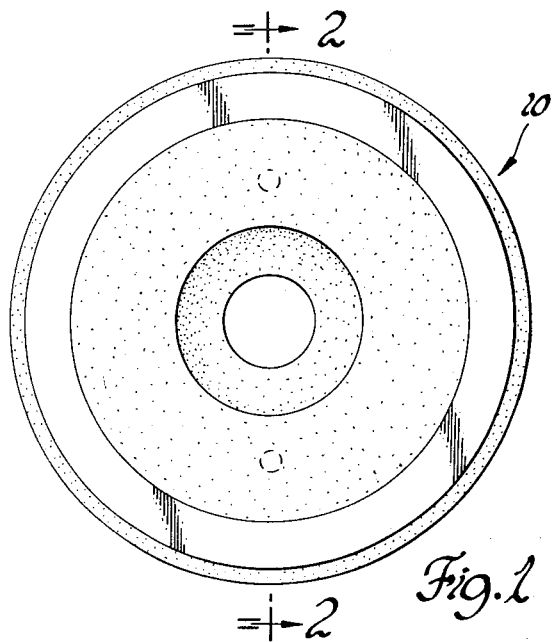
FIG. 1 is an elevational view of an embodiment of the instant invention.

Referring to the drawings a gear wheel assembly of the type for moving a motion transmitting element is generally shown at 10. The gear wheel 10 includes a circular metal member 12 having a circumferential slot 14 with helical gear teeth 16 disposed therein.

The circular metal member 12 is comprised of two substantially identical metal halves 18 and 20 which are joined together in face to face relationship to form the complete helical gear teeth 16 which are defined by a plurality of arcuate grooves 17. The angular pitch of the arcuate grooves 17 on one of the metal halves may be slightly different from the other to facilitate positive registry between the helical gear teeth 16 and the spiral wire of the core element. The mating surface 22 on each of the metal halves 18 and 20 includes a protrusion 24 and a depression 26 which register in order that the helical teeth 16 are aligned when the two halves are mated together.

Figure 2:
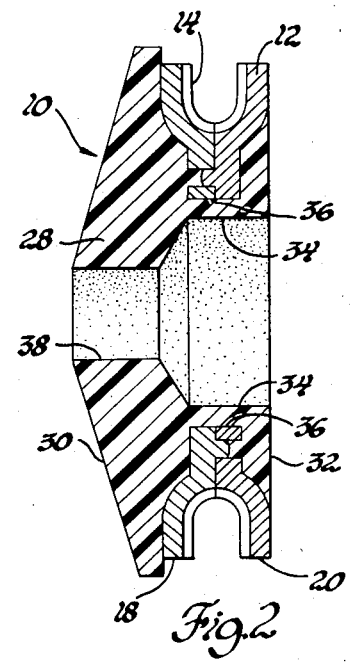
FIG. 2 is a cross sectional view taken along lines 2—2 of FIG. 1.
Figure 3:
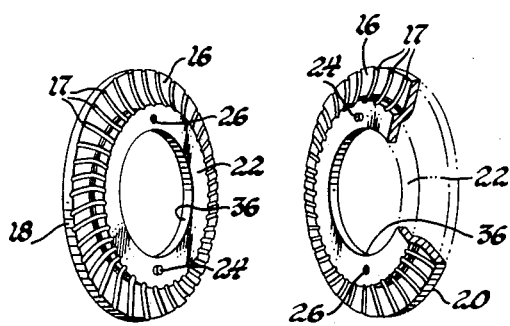
FIG. 3 is an exploded view of the metal means of the instant invention.
Figure 4:
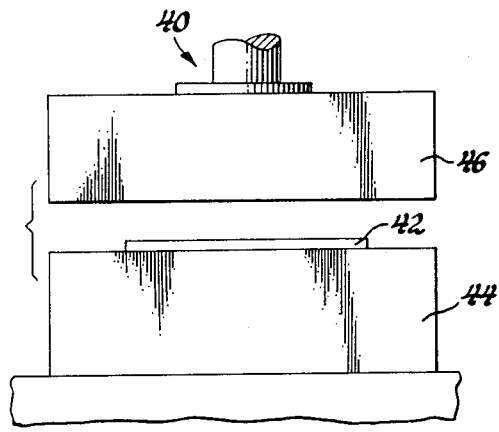
FIG. 4 is a front elevational view of a stamping press.
Figure 5:
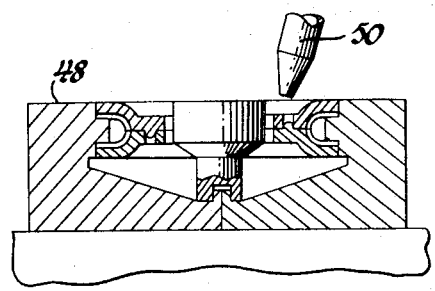
FIG. 5 is a cross sectional view of a mold die.

The two metal halves 18 and 20 when joined are supported and surrounded by a plastic hub member 28 which is molded partially around the metal halves as best shown in FIG. 2. The plastic hub member 28 includes a truncated cone portion 30 disposed on one side of the circular metal member 12 and a generally flat section 32 disposed on and molded to the opposite side thereof. A connecting portion 34 extends through an axial bore 36 in the circular metal member 12 to connect the truncated portion 30 with the flat section 32 thereby holding the metal halves 18 and 20 of the metal member 12 together. The plastic hub member 28 includes a central bore 38 extending therethrough to receive a drive shaft (not shown) or other suitable drive means therein to facilitate the rotation of the gear wheel 10.

The method for manufacturing a gear wheel constructed in accordance with the instant invention includes the step of stamping out of a metal work piece, the substantially identical metal sections 18 and 20 by means of a stamping press generally shown at 40. A metal workpiece 42 is held in a suitable chuck on the anvil portion 44 of the stamping press 40. The stamping head 46 and the anvil portion 44 are provided with two sets of interchangeable properly machined tool dies to form the metal halves 18 and 20. It is to be understood that in a production situation two or more stamping presses may be employed to stamp out the metal halves 18 and 20 simultaneously, each pair of presses being provided with slightly different dies for the desired angular pitch on each half. The head portion 46 is adapted to rotate as it strikes the work piece 42 to form the arcuate grooves 17 and therefore the helical teeth around the periphery of each of the metal halves.

One of each of the metal halves so produced are mated together and registered by means of the depressions and protrusions on their mating surfaces 22. The two metal sections 18 and 20 may be welded or brazed together or joined by any permanent bonding operation. The assembly, comprising the circular metal member 12, is placed and held within a mold die 48. A plastic material is injected into the mold die 48 by injection means 50 to form the plastic hub member 28. It is to be understood that the method of invention is not limited to producing a gear wheel partially surrounded by a plastic hub member but that the gear wheel may be produced by the stamping, rotating and mating steps and used without the plastic hub member. A mold core 52 may be provided to form the central bore 38 or, alternatively, the central bore may be formed by any conventional drilling operation.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that with the scope of the appended claims, the invention may be practiced otherwise than as specifically described.

The embodiments of the invention in which an exclusive property or privilege is claimed are defined as follows:

1. A method for manufacturing a gear wheel comprising the steps of forming at least two metal sections of substantially identical shape and shaping helical gear teeth in a concave depression on the peripheries thereof; mating and joining said sections to cause said gear teeth in each of said sections to be aligned with said gear teeth in the other of said sections, and molding a plastic hub member partially about said sections to support said sections.

2. The method as set forth in claim 1 wherein forming is further defined as rotating at least a portion of a tool to simultaneously form said sections and form said helical teeth on the periphery thereof.

3. The method as set forth in claim 2 wherein forming is further defined as simultaneously forming alignment means including at least one protrusion and depression on the mating surfaces of each of said metal sections.

4. The method as set forth in claim 1 wherein said joining is further defined as permanently bonding said two metal sections together.

5. The method as set forth in claim 4 wherein bonding is defined as brazing said two metal sections together.

6. A method for manufacturing a gear wheel assembly of the type used for moving a motion transmitting element comprising the steps of stamping with a stamping tool at least two substantially identical metal gear halves and forming arcuate grooves defining helical gear teeth in a concave depression on the peripheries thereof by substantially simultaneously rotating said stamping tool; and mating and joining said halves whereby said gear teeth in each of said metal gear halves are aligned with the gear teeth in the other of said metal gear halves.

* * * * *